United States Patent
Kohiga

(10) Patent No.: US 10,565,009 B2
(45) Date of Patent: Feb. 18, 2020

(54) PLANNING SYSTEM FOR PLANNING DISPOSITION OF VIRTUAL MACHINE, PLANNING METHOD, AND RECORDING MEDIUM FOR STORING PLANNING PROGRAM

(71) Applicant: NEC Corporation, Minato-ku, Tokyo (JP)

(72) Inventor: Akihito Kohiga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 25 days.

(21) Appl. No.: 15/777,301

(22) PCT Filed: Dec. 6, 2016

(86) PCT No.: PCT/JP2016/086191
§ 371 (c)(1),
(2) Date: May 18, 2018

(87) PCT Pub. No.: WO2017/099061
PCT Pub. Date: Jun. 15, 2017

(65) Prior Publication Data
US 2018/0300172 A1   Oct. 18, 2018

(30) Foreign Application Priority Data

Dec. 8, 2015   (JP) .................................. 2015-239510

(51) Int. Cl.
*G06F 9/455*   (2018.01)
*G06F 9/48*   (2006.01)
(Continued)

(52) U.S. Cl.
CPC .......... *G06F 9/4856* (2013.01); *G06F 9/5077* (2013.01); *G08G 1/0133* (2013.01)

(58) Field of Classification Search
None
See application file for complete search history.

(56) References Cited

U.S. PATENT DOCUMENTS

| 2002/0133329 A1 | 9/2002 | Kano et al. |
| 2011/0054874 A1 | 3/2011 | Ikeda et al. |

(Continued)

FOREIGN PATENT DOCUMENTS

| JP | 2002-259888 A | 9/2002 |
| JP | 2009-093425 A | 4/2009 |

(Continued)

OTHER PUBLICATIONS

International Search Report for PCT Application No. PCT/JP2016/086191, dated Mar. 14, 2017.

(Continued)

*Primary Examiner* — Gregory A Kessler

(57) ABSTRACT

Provided is a system for planning the disposition of a virtual machine which predicts a load without history information. This planning system includes: a migration plan generating means for generating, on the basis of a moving route planned by a moving object, a virtual machine migrating plan which represents a moving object in a moving object simulation; and a dividing plan generating means for predicting, on the basis of the virtual machine migrating plan, a load of a physical machine where the virtual machine operates, and allocating the physical machine in a district obtained by dividing a geographical area in the moving object simulation.

9 Claims, 21 Drawing Sheets

(51) Int. Cl.
    *G06F 9/50*     (2006.01)
    *G08G 1/01*     (2006.01)

(56) References Cited

U.S. PATENT DOCUMENTS

| | | | |
|---|---|---|---|
| 2012/0084774 A1* | 4/2012 | Post | G06F 9/5088 718/1 |
| 2012/0095740 A1 | 4/2012 | Kitagawa et al. | |
| 2012/0203528 A1 | 8/2012 | Ikeda et al. | |
| 2015/0178127 A1* | 6/2015 | Karunamoorthy | G06F 9/4856 718/1 |

FOREIGN PATENT DOCUMENTS

| | | |
|---|---|---|
| JP | 2011-048757 A | 3/2011 |
| JP | 2011-118525 A | 6/2011 |
| JP | 2012-181647 A | 9/2012 |
| JP | 2013-200615 A | 10/2013 |
| WO | 2011/001512 A1 | 1/2011 |
| WO | 2011/018854 A1 | 2/2011 |

OTHER PUBLICATIONS

English translation of Written opinion for PCT Application No. PCT/JP2016/086191.

* cited by examiner

Fig. 6

| DISTRICT ID | NORTH SIDE LATITUDE | SOUTH SIDE LATITUDE | WEST SIDE LONGITUDE | EAST SIDE LONGITUDE | PHYSICAL MACHINE ID |
|---|---|---|---|---|---|
| 1 | 38.245 | 39.245 | 144.235 | 146.222 | 1 |
| 2 | 39.245 | 40.245 | 144.235 | 146.222 | 2 |
| ... | ... | ... | ... | ... | ... |

Fig. 7

| VIRTUAL MACHINE ID | PHYSICAL MACHINE ID | PHYSICAL MACHINE ID |
|---|---|---|
| VIRTUAL MACHINE START TIME | 1 | |
| 15:33:24 | 1 | |
| VIRTUAL MACHINE MIGRATION TIME | | |
| 15:47:24 | 2 | |
| 16:33:16 | 4 | |
| ... | ... | |

| DISTRICT ID | 1 |
|---|---|
| POINT IN TIME | NUMBER OF VIRTUAL MACHINES |
| 14:24:25 | 5 |
| 14:24:26 | 2 |
| 14:24:27 | 3 |
| ... | ... |
| 14:24:34 | 10 |
| 14:24:35 | 15 |

| DISTRICT ID | 1 | | | | |
|---|---|---|---|---|---|
| START TIME | 14:24:33 | | | | |
| POST-DIVISION DISTRICT INFORMATION | NEW DISTRICT ID | NEW DISTRICT LOCATION | | | |
| | 1-1 | 38.245, 38.543, 144.235, 145.235, 145.222 | | | |
| | 1-2 | 38.245, 38.543, 145.235, 146.222 | | | |
| | ... | ... | | | |

| NEW DISTRICT ID | PHYSICAL MACHINE ID | VIRTUAL EXECUTION MACHINE ID |
|---|---|---|
| 1-1 | 1 | 1,2,4,6,12,··· |
| 1-2 | 14 | 14,22,26,44,52 |
| ··· | ··· | ··· |

METHOD OF OBTAINING COORDINATES OF POINT OF INTERSECTION $$x = \frac{\alpha(x_4 - x_3) - \beta(x_2 - x_1)}{\Delta} \quad y = \frac{\alpha(y_4 - y_3) - \beta(y_2 - y_1)}{\Delta}$$

$$\alpha = \begin{vmatrix} x_1 & y_1 \\ x_2 & y_2 \end{vmatrix}, \beta = \begin{vmatrix} x_3 & y_3 \\ x_4 & y_4 \end{vmatrix}, \Delta = \begin{vmatrix} y_2 - y_1 & x_2 - x_1 \\ y_4 - y_3 & x_4 - x_3 \end{vmatrix}$$

DISTANCE BETWEEN TWO POINTS (EXAMPLE: MANHATTAN DISTANCE)
$$D = |x_1 - x_2| + |y_1 - y_2|$$

PLANNING SYSTEM FOR PLANNING DISPOSITION OF VIRTUAL MACHINE, PLANNING METHOD, AND RECORDING MEDIUM FOR STORING PLANNING PROGRAM

This application is a National Stage Entry of PCT/JP2016/086191 filed on Dec. 6, 2016, which claims priority from Japanese Patent Application 2015-239510 filed on Dec. 8, 2015, the contents of all of which are incorporated herein by reference, in their entirety.

TECHNICAL FIELD

The present invention relates to a planning system for planning the disposition of virtual machines, a planning method, and a recording medium for storing a planning program.

BACKGROUND ART

FIG. 1 and FIG. 2 illustrate a moving object simulation system employing virtual machines. A moving object simulation is a program that makes an imitative representation on a computer of how moving objects such as automobiles and trains travel on roads and railroads. Such a moving object simulation is used for predicting congestions at a time of an accident or for identifying places that cause chronic congestions.

FIG. 1 illustrates a map 2000 and moving objects 3000 that move on the map. With reference to FIG. 1, the map 2000 is divided into districts of a certain size, respectively named district 1, district 2, district 3, and district 4.

FIG. 2 illustrates an example employing virtual machines as computer environment for carrying out a moving object simulation. As illustrated in FIG. 2, physical machines 4000 to 4003 are respectively allocated to the districts described with reference to FIG. 1. The moving objects 3000 are caused to appear in each district by a moving object simulation program 120 operating on virtual machines. These virtual machines are managed by Hypervisors. In such a moving object simulation employing virtual machines, when a moving object 3000 moves from one district to another, a virtual machine on which the corresponding moving object simulation program 120 operates is migrated to one of the physical machines 4000 to 4003 that represents the district to which the moving object 3000 moves.

When a load on a physical server (physical machine 4000 to 4003) for a particular district exceeds a permissible amount due to a concentration of moving objects to the district (traffic congestion or the like), the number of physical servers allocated to the district needs to be increased. On the other hand, when the load on the physical server does not exceed the permissible amount, no physical servers need to be additionally provided. Estimating in advance whether the load will exceed the permissible amount enables appropriate additional provision of servers, for additional provision of physical servers entails calculation cost for a process of additional provision and financial cost for a the procurement of physical servers.

PTL 1 discloses a technique for disposing virtual machines on execution servers on the basis of a load calendar for a management of load prediction of virtual machines.

PTL 2 discloses a technique for making a moving plan for virtual machines more appropriately according to a state of network bands.

PTL 3 discloses a technique for executing a control on a physical server in accordance with a result of prediction of changes in a load on an object to be managed based on a history of load changes in the past.

CITATION LIST

Patent Literature

[PTL 1] Japanese Unexamined Patent Application Publication No. 2012-181647.
[PTL 2] Japanese Unexamined Patent Application Publication No. 2013-200615.
[PTL 3] Japanese Unexamined Patent Application Publication No. 2011-118525.

SUMMARY OF INVENTION

Technical Problem

In PTL 1, load information obtained during execution is recorded to compile a load calendar and, for each day of the load calendar, necessary execution servers are calculated. Suppose that the technique in PTL 1 is applied to a moving object simulation. A congestion occurs at a certain intersection at a certain point in time and the load on the physical server allocated to the district including the intersection increases. This increase in the load is recorded as a history and, when the same simulation is conducted for the next time, additional physical servers are provided before the increase in the load exceeds a threshold value by using history information. However, the history information changes in reality every time a simulation is conducted. The purpose of a simulation is to reproduce on a computer a situation that is difficult to realize in the real world to make a prediction on an unknown situation by observing the changes in outputs in response to inputs. In other words, in actual simulations, once a simulation is conducted and the result is obtained, the same simulation using the same input parameters will no longer be conducted but a simulation using different parameters will be conducted to make a further observation on an unknown situation. In case of moving object simulation as an example, once a place with a congestion has been identified with respect to an input parameter (a number of automobiles or the like), the moving object simulation will not be conducted by using the same input for the next time. A subsequent moving object simulation will be conducted by using a new input such as an occurrence of accident in a certain lane to simulate a different situation and see what sort of congestions will occur. In the simulation of a different situation, the places of congestion may be different from those of the previous simulation. In other words, since a load increase occurs in different physical servers in each simulation, it is unlikely that history information can be utilized.

As in the case of PTL 1, applying the techniques in PTL 2 and PTL 3 to a moving object simulation does not enable a load prediction without using history information.

Using the techniques in the afore-mentioned literature in a moving object simulation does not enable a load prediction without using history information.

Thus, an object of the present invention is to provide a planning system and the like to realize a load prediction without using history information to address the above-described problem.

Solution to Problem

The planning system in one form of this invention includes, a migration plan generating means to generate a migration plan of virtual machines representing moving objects in a moving object simulation, based on moving routes that the moving objects plan to travel; and a dividing plan generating means to predict, based on the migration plan of the virtual machines, loads on physical machines on which the virtual machines operate and to allocate the physical machines to districts created by dividing a geographical area in the moving object simulation.

The planning method in one form of this invention comprising, generating a migration plan of virtual machines representing moving objects in a moving object simulation, based on moving routes that the moving objects plan to travel; and predicting, based on the migration plan of the virtual machines, loads on physical machines on which the virtual machines operate and allocating the physical machines to districts created by dividing a geographical area in the moving object simulation.

The recording medium in one form of this invention causes a computer to execute:

a process of generating a migration plan of virtual machines representing moving objects in a moving object simulation, based on moving routes that the moving objects plan to travel; and a process of predicting, based on the migration plan of the virtual machine, loads on physical machines on which the virtual machines operate and allocating the physical machines to districts created by dividing a geographical area in the moving object simulation.

Advantageous Effects of Invention

The present invention has advantageous effects of predicting the load on a physical server without using history information.

BRIEF DESCRIPTION OF DRAWINGS

FIG. 6 is a diagram illustrating an example data structure of district information according to the first example embodiment of the present invention.

FIG. 7 is a diagram illustrating an example data structure of a virtual machine migration planning table according to the first example embodiment of the present invention.

FIG. 8 is a diagram illustrating an example data structure of a time-load list according to the first example embodiment of the present invention.

FIG. 9 is a diagram illustrating an example data structure of a district dividing planning table according to the first example embodiment of the present invention.

FIG. 10 is a diagram illustrating an example data structure of a virtual machine disposition planning table according to the first example embodiment of the present invention.

FIG. 15 is a diagram for describing a method of obtaining the coordinates of a point of intersection according to the first example embodiment of the present invention.

DESCRIPTION OF EMBODIMENTS

First Example Embodiment

A first example embodiment of the present invention will be described in detail with reference to the drawings.

Figure 1:
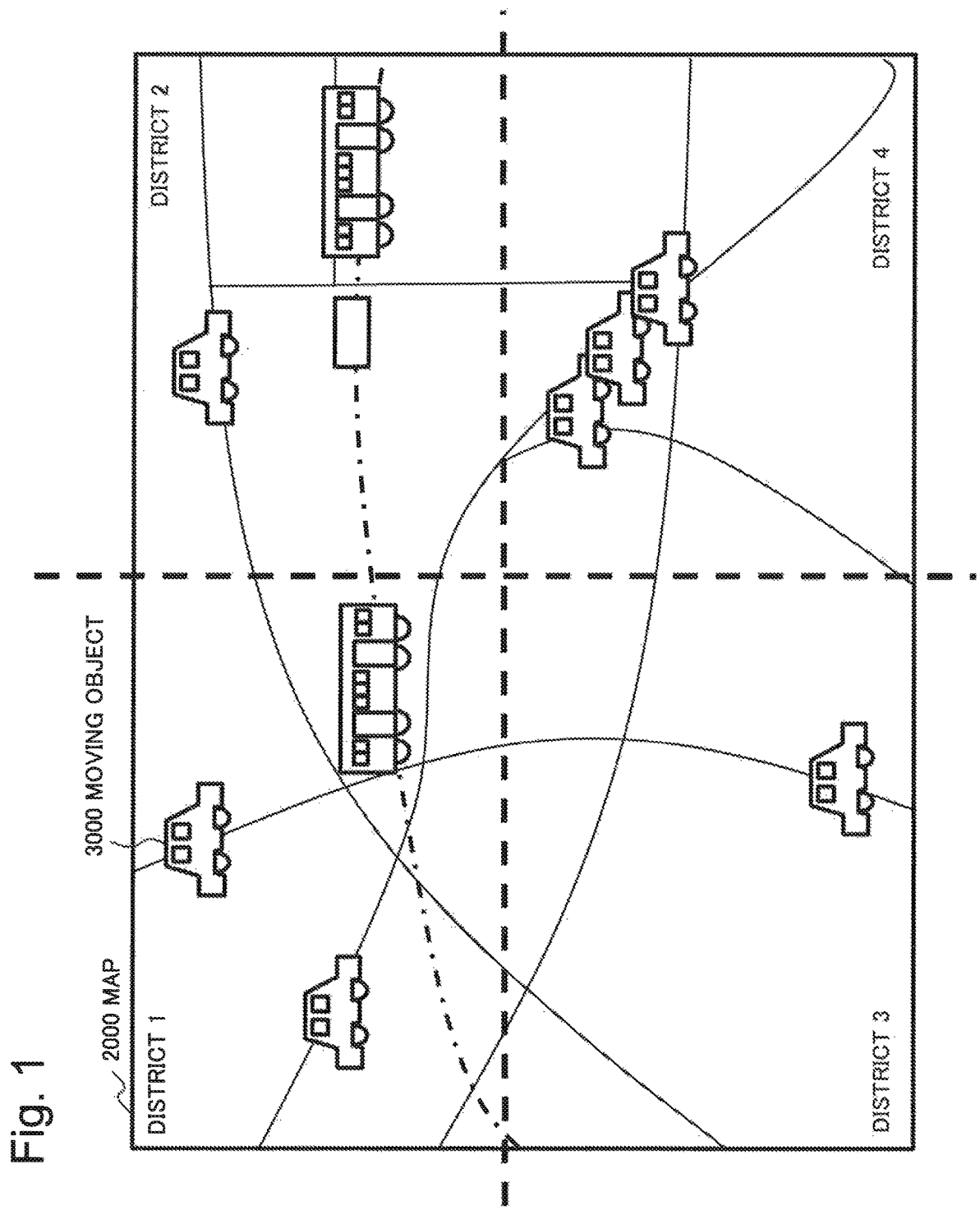
FIG. 1 is a diagram of a map and moving objects for describing a moving object simulation according to a background art.
Figure 2:
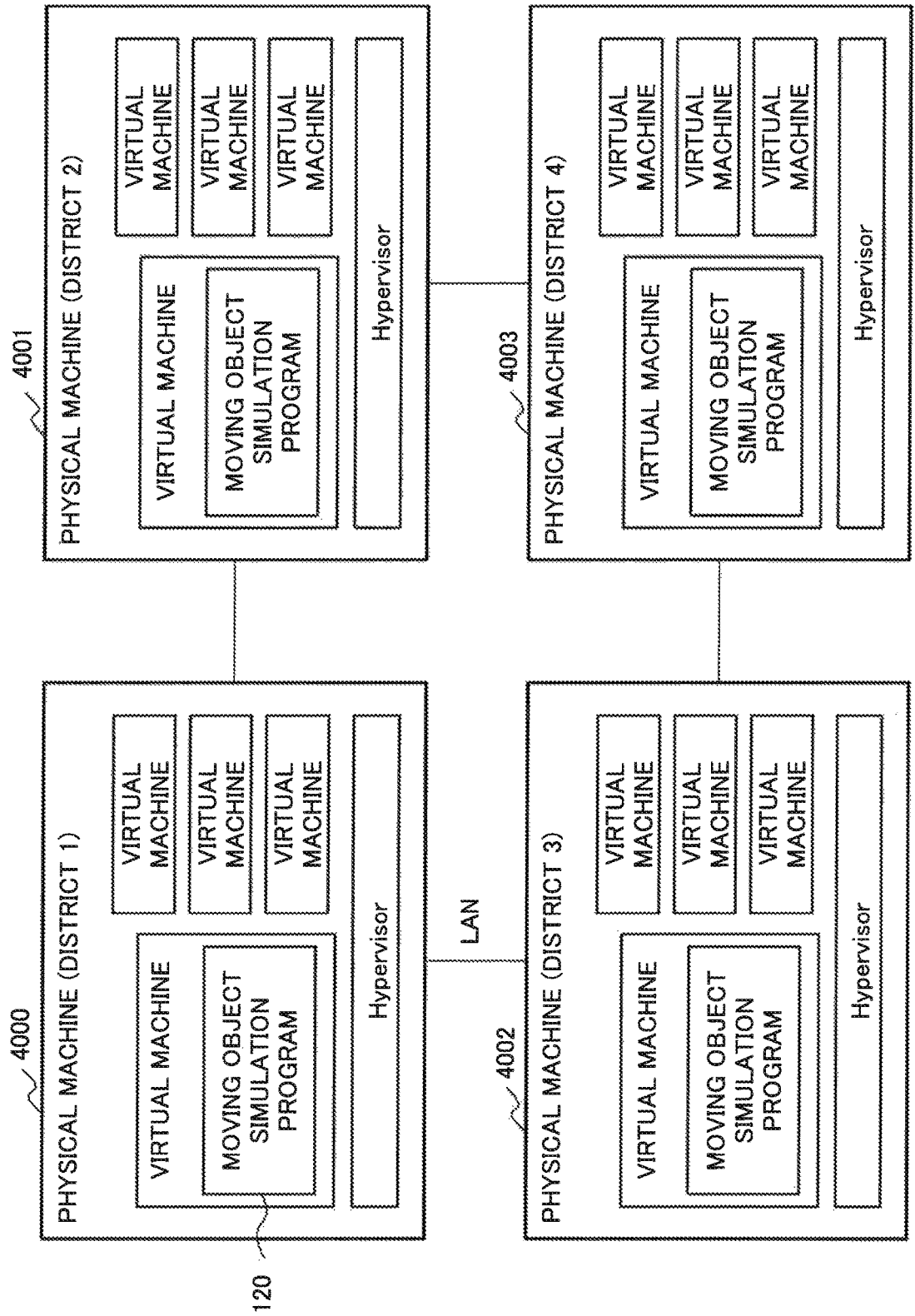
FIG. 2 is a block diagram for describing a moving object simulation using virtual machines according to a background art.
Figure 3:
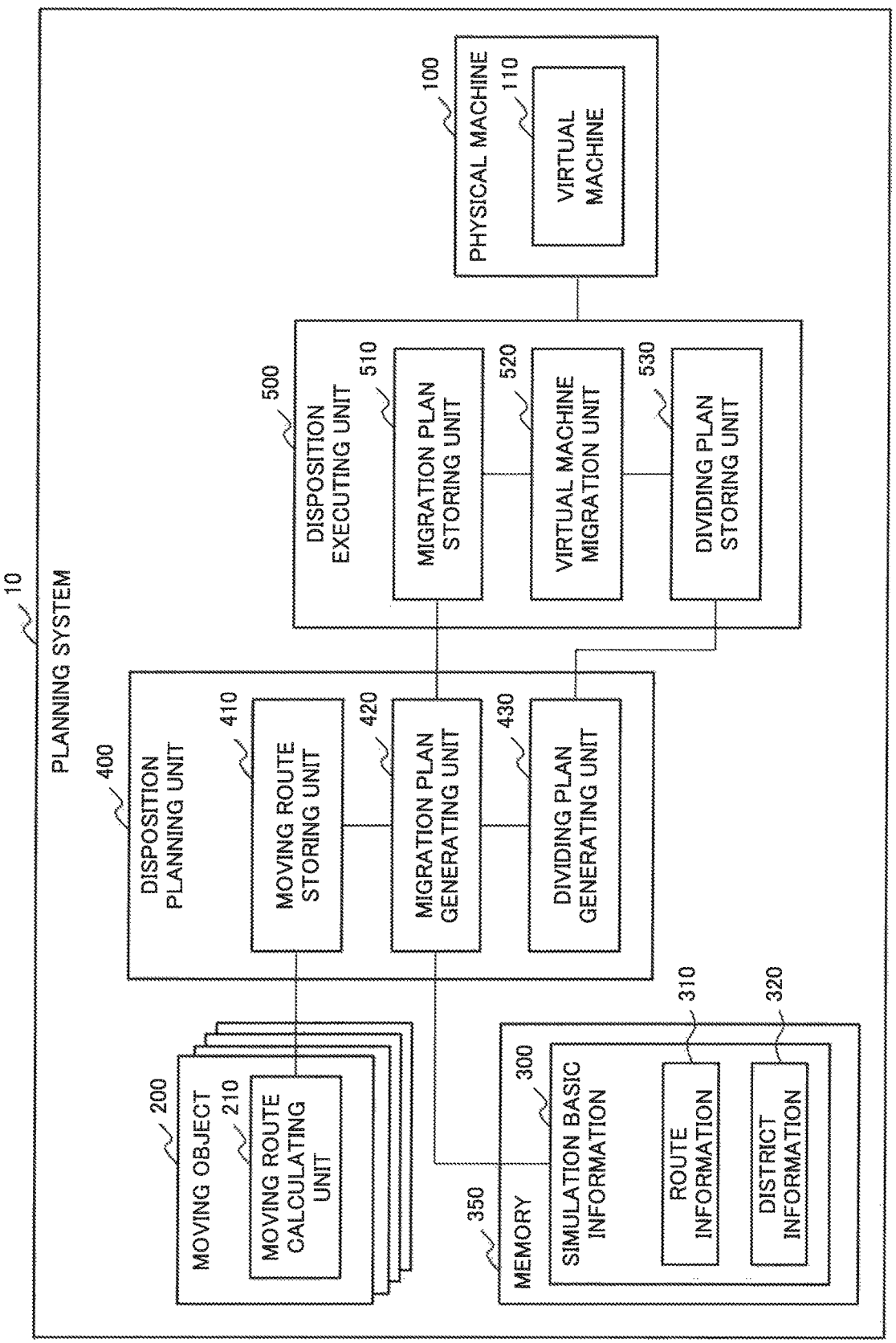
FIG. 3 is a block diagram illustrating an example configuration of a planning system according to a first example embodiment of the present invention.

FIG. 3 is a block diagram illustrating an example configuration of a planning system 10 for planning the disposition of virtual machines.

With reference to FIG. 3, the planning system 10 includes moving objects 200, memory 350, a disposition planning unit 400, a disposition executing unit 500, and physical machines 100 (also referred to as a physical machine group 100).

The moving objects 200 include moving route calculating units 210.

The memory 350 stores simulation basic information 300. The simulation basic information 300 includes route information 310 and district information 320.

The disposition planning unit 400 includes a moving route storing unit 410, a migration plan generating unit 420, and a dividing plan generating unit 430.

The disposition executing unit 500 includes a migration plan storing unit 510, a virtual machine migration unit 520, and a dividing plan storing unit 530.

The physical machines 100 include virtual machines 110. The physical machines 100 are a set of physical machines 100, which are computers for operating the virtual machines 110. The virtual machines 110 are a set of virtual machines 110, which are virtual computers for executing a moving object simulation program 120. Each physical machine 100 includes one or more virtual machine 110.

These components operate as in the following in outline.

The moving objects 200 represent objects that move on a geographical plane such as automobiles, airplanes and humans. In the present example embodiment, the moving objects 200 represent a simulation program that simulates the moving objects appearing on a moving object simulation. The moving route calculating unit 210 is a means to calculate, when each moving object 200 starts to move, a route that the moving object 200 travels to arrive at a destination 215 by using as input values a present location 214 and the destination 215 to be described later with reference to FIG. 4. The route calculated by the moving route calculating unit 210 is stored in the moving route storing unit 410 as moving route information 210-1. More specifically, information outputted by an automotive navigation system of an automobile or a train timetable corresponds to the moving route information 210-1.

Figure 4:
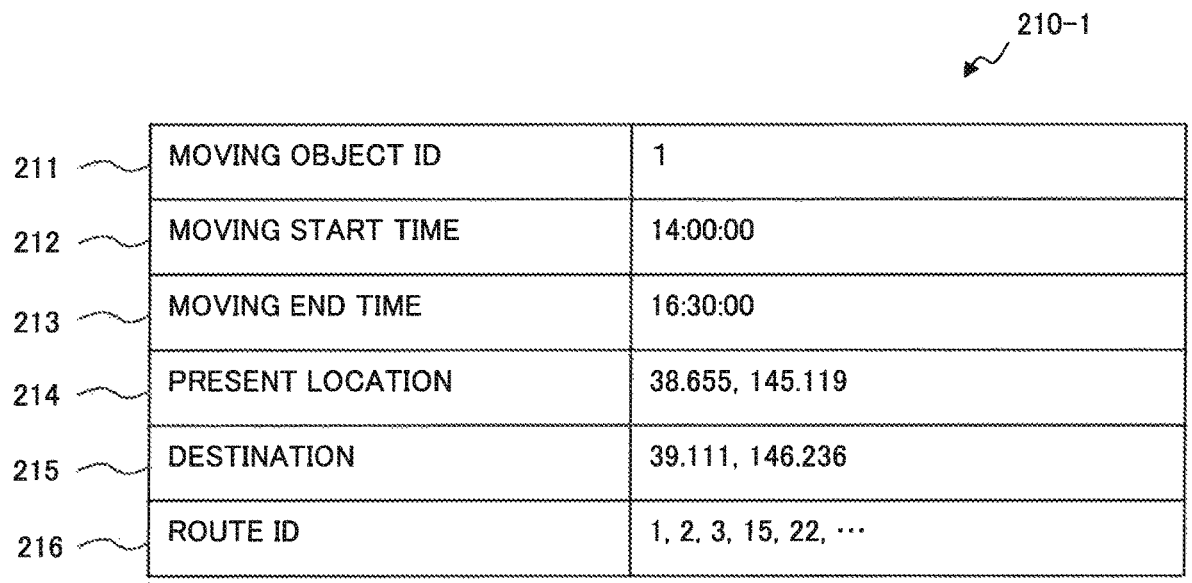
FIG. 4 is a diagram illustrating an example data structure of moving route information according to the first example embodiment of the present invention.

FIG. 4 illustrates an example data structure of moving route information 210-1 calculated by the moving route calculating unit 210. As illustrated in FIG. 4, the moving route information 210-1 includes a moving object ID (identification number) 211, a moving start time 212, a moving end time 213, a present location 214, a destination 215, and route IDs 216. The moving object ID 211 is an identifier of the moving object 200 that includes the moving route calculating unit 210 that generated the moving route information 210-1. The moving start time 212 is a point in time when the moving object 200 started to move. The moving end time 213 is a point in time when the moving object 200 finishes moving. The present location 214 is a value indicating the location from which the moving object 200 starts to move in latitude and longitude. The destination 215 is a value indicating the location where the moving object 200 finishes moving in latitude and longitude. The route IDs 216 indicate a set of routes that the moving object 200 travels until it reaches the destination 215.

The simulation basic information 300 is geographic information used for simulation. The simulation basic information 300 includes route information 310 and district information 320.

The memory 350 stores the simulation basic information 300.

Figure 5:
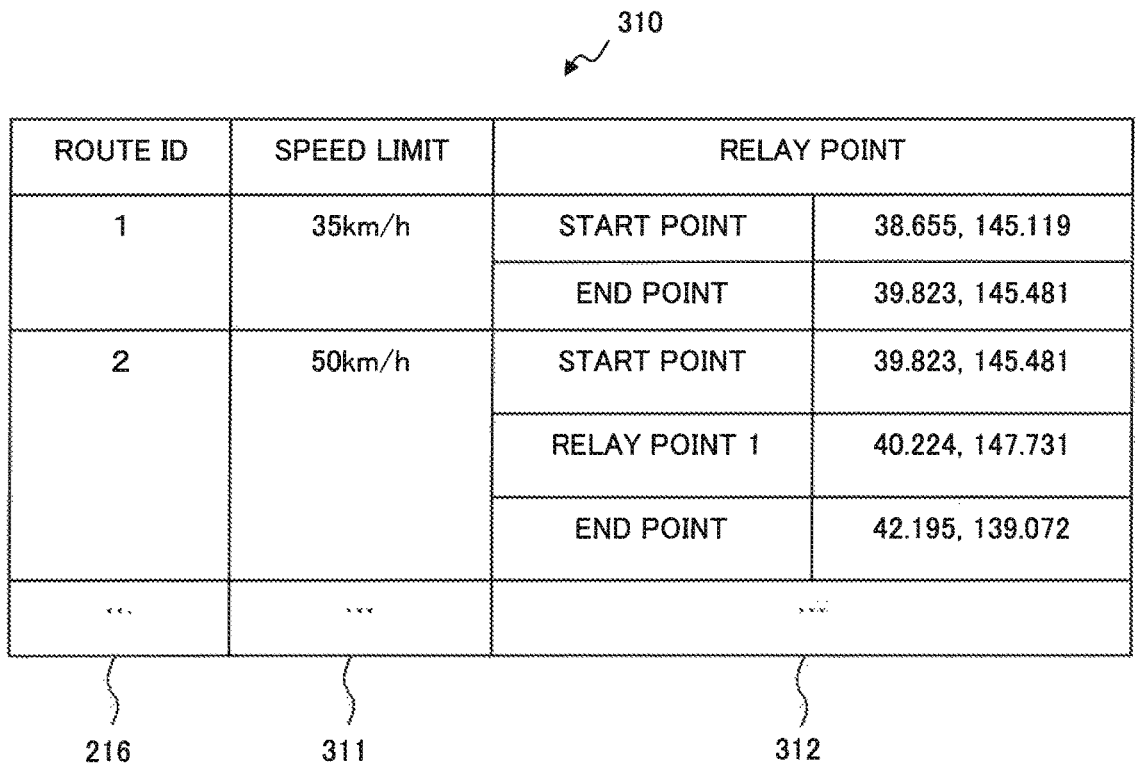
FIG. 5 is a diagram illustrating an example data structure of route information according to the first example embodiment of the present invention.

The route information 310 includes information on routes. FIG. 5 is a diagram illustrating an example data structure of the route information 310. The route information 310 includes route IDs 216, speed limits 311, and relay points 312. The route IDs 216 are identifiers given to the routes. The speed limits 311 indicate respective upper speed limits of the routes. The speed limits 311 are used for calculating respective times of travel along the routes. The relay points 312 indicate points on each of the routes in latitude and longitude and each of the relay points at least includes a start point and an end point. Further, each of the relay points 312 may also include any number of relay points 312 ("relay point 1" in FIG. 5 and the like). A route having only a start point and an end point is a straight line. A route having a relay point 312 in addition to a start point and an end point is a route that may be a curve.

The district information 320 is information on geographic regions partitioned at fixed intervals. FIG. 6 is a diagram illustrating an example data structure of the district information 320. The district information 320 includes district IDs 321, north side latitudes 322, south side latitudes 323, west side longitudes 324, east side longitudes 325, and physical machine IDs 326. The district IDs 321 are identifiers allocated to respective districts. Each of the north side latitudes 322 indicates the latitude of the northern boundary of the corresponding district. Each of the south side latitudes 323 indicates the latitude of the southern boundary of the corresponding district. Each of the west side longitudes 324 indicates the longitude of the western boundary of the corresponding district. Each of the east side longitudes 325 indicates the longitude of the eastern boundary of the corresponding district. Each of the physical machine IDs 326 is an identifier of the physical machine 100 allocated to the corresponding district.

The disposition planning unit 400 generates a disposition plan of the virtual machines 110 for designated points in time on the basis of the moving route information 210-1 of the moving objects 200 and the simulation basic information 300 and generates an allocation plan of the physical machines 100 to the districts. The disposition planning unit 400 includes a moving route storing unit 410, a migration plan generating unit 420, and a dividing plan generating unit 430.

The moving route storing unit 410 stores the moving route information 210-1 sent by the moving objects 200.

The migration plan generating unit 420 generates a disposition plan of the virtual machines 110 for designated points in time on the basis of the moving route information 210-1 of the moving objects 200 and the simulation basic information 300. More specifically, the migration plan generating unit 420 calculates the route on which each of the moving objects 200 is located by using the moving start time 212 and the route IDs 216 included in the moving route information 210-1 and the speed limits 311 included in the route information 310 in the simulation basic information 300. With reference to FIGS. 4 and 5, for example, when the moving start time 212 is 14:00:00, the moving object travels the route having the route ID "1", and the speed limit 311 for the route ID "1" is 35 km/h, the distance of the route having the route ID "1" is calculated as about 2.68 km on the basis of the start point (38.655, 145.119) and the end point (39.823, 145.481). Consequently, since the speed limit 311 is 35 km/h, the time of travel along the route having the route ID "1" is calculated as about 4 minutes 30 seconds. This entails that the moving object 200 travels the route having the route ID "1" from the moving start time 14:00:00 until 14:04:30. Since the route having the route ID "1" is included in the district having the district ID "1" as is known from the relay point 312 of the route information 310 in FIG. 5 and the district information 320 in FIG. 6 of the simulation basic information 300, the virtual machine 110 constituting the moving object 200 operates on the physical machine 100 having the physical machine ID "1" during the time when the moving object 200 is traveling the route having the route ID "1". In this example, acceleration of the moving object 200 and the cases in which the moving object 200 starts moving from any point in the route but the start point are ignored. As described above, the migration plan generating unit 420 calculates the location of each of the moving objects 200 at designated points in time. The migration plan generating unit 420 then calculates on which physical machine 100 the corresponding virtual machine 110 presents at a given point in time, and obtains a virtual machine migration planning table 420-1.

FIG. 7 is a diagram illustrating an example data structure of a virtual machine migration planning table 420-1. As illustrated in FIG. 7, the virtual machine migration planning table 420-1 includes a virtual machine ID 421 (also referred to as virtual execution machine ID 421), a virtual machine start time 422, virtual machine migration times 423, and physical machine IDs 326. The virtual machine ID 421 is an identifier of the virtual machine 110 executing the moving object simulation program 120. The moving object simulation program 120 operates on each of the virtual machines 110. The virtual machine start time 422 is the time when the virtual machine 110 is started, which is also the time when the moving object 200 starts to move. The virtual machine start time 422 is associated with a physical machine ID 326 and, in FIG. 7, the virtual machine start time 422 is 15:33:24 and the physical machine ID 326 of the physical machine 100 that starts the virtual machine 110 is "1". The virtual machine migration times 423 indicate the points in time when the virtual machine 110 migrates from one district to another. The virtual machine migration times 423 are associated with physical machine IDs 326. In FIG. 7, the virtual machine 110 has a migration time of 15:47:24, and the physical machine ID 326 of the physical machine 100 to which the virtual machine 110 migrates at that time is "2".

The dividing plan generating unit 430 performs a function for providing an additional physical machine 100 for the district when the load on the physical machine 100 allocated to the district has exceeded a threshold value. More specifically, the dividing plan generating unit 430 generates a time-load list 430-1 from the virtual machine migration planning table 420-1 generated by the migration plan generating unit 420, searches the time-load list 430-1 for a district with a high load, and allocates a new physical machine 100 to the district with a high load. The dividing plan generating unit 430 outputs a district dividing planning table 430-2 and a virtual machine disposition planning table 430-3 to provide a concrete method of allocating a physical machine 100 to the district with a high load.

FIG. 8 illustrates an example data structure of the time-load list 430-1. The time-load list 430-1 includes a district ID 321, points in time 431, and the number of virtual machines 432. The time-load list 430-1 indicates the load on a district at every unit time (one second). In other words, for each district ID 321, the points in time 431 and the number of virtual machines 432 are generated and stored by the dividing plan generating unit 430. In FIG. 8, the number of virtual machines 110 at each point in time is used to indicate the load on the district having the district ID 321 "1" but indices other than the number of virtual machines 110 may be used. For example, an estimated CPU utilization of each physical machine 100 may be calculated by defining CPU utilization per virtual machine 110 as a constant. When the number of virtual machines 110 exceeds a threshold value, the dividing plan generating unit 430 increases the number of physical machines 100 allocated to the district. The dividing plan generating unit 430 generates a district dividing planning table 430-2 and a virtual machine disposition planning table 430-3 to provide a concrete procedure for increasing the number of the physical machines 100 allocated to the district.

FIG. 9 and FIG. 10 are diagrams illustrating example data structures of the district dividing planning table 430-2 and the virtual machine disposition planning table 430-3. As illustrated in FIG. 9, the district dividing planning table 430-2 includes a district ID 321, a start time 433, and post-division district information, and the post-division district information includes new district IDs 434 and new district locations 435. The district ID 321 is an identifier of a district for which an additional physical server is provided. The start time 433 indicates the point in time when the additional physical server is provided for the district. With reference to post-division district information, the new district IDs 434 are identifiers of the post-division districts. The new district locations 435 indicate the east and west longitudes and the north and west latitudes of the boundaries of the post-division districts. Additional provision of a physical server for a district is expressed as a division of the district. In FIG. 9, district 1 is divided into district 1-1 and district 1-2. A physical server is allocated to each of the divided districts.

FIG. 10 is a diagram illustrating an example data structure of the virtual machine disposition planning table 430-3. As illustrated in FIG. 10, the virtual machine disposition planning table 430-3 includes new district IDs 434, physical machine IDs 326, and virtual execution machine IDs 421. The table includes district IDs in the form of new district IDs 434, which indicate the IDs of the new districts created after the division, and a physical machine ID 326 and a virtual execution machine ID 421 are allocated to each of the new districts. Two kinds of physical machines 100 are allocated to the new districts: one physical machine has a physical machine ID 326 originally allocated in the district information 320 illustrated in FIG. 6 and the other physical machine has a newly added physical machine ID. In FIG. 10, the physical machine ID "1" is allocated to the district ID "1-1" and the physical machine ID "14" is allocated to the district ID "1-2". In the district information 320 in FIG. 6, the physical machine ID "1" is allocated to the district ID "1". Thus, the physical machine 100 allocated to the district having the district ID 1-1 has an originally allocated physical machine ID 326 while the physical machine 100 allocated to the district having the district ID 1-2 has a newly allocated physical machine ID 326. The virtual execution machine IDs 421 are sets of virtual machine IDs 421 of the virtual machines to be operated on the physical machines 100 respectively allocated to the districts.

The start time 433 of the district dividing planning table 430-2 illustrated in FIG. 9 indicates a point in time obtained by subtracting a certain time period from the point in time when the load of the district exceeds the threshold value. This certain time period is a processing time required for dividing the district and, more specifically, is a time required for the migration of virtual machines 110 following the district division. In the example illustrated in FIG. 10, when district 1 is divided into district 1-1 and district 1-2, the original physical machine 100 (physical machine ID "1") is allocated to district 1-1 and a new physical machine 100 (physical machine ID "14") is allocated to district 1-2. When the district is divided, the virtual machines 110 operating on the physical machine allocated to district 1 need to be migrated to the new districts. In the example illustrated in FIG. 10, the virtual machines having the virtual machine IDs 421 "14, 22, 26, 44, 52", which are to execute the moving objects 200 present in district 1-2, are migrated from the physical machine having the physical machine ID "1" to the physical machine having the physical machine ID "14". In reality the time for executing the migration of a virtual machine 110 differs from one virtual machine 110 to another but, in the present example embodiment, the execution time is assumed to be constant and the processing for calculating the time for executing the migration of the virtual machines 110 will not be further described.

The disposition executing unit 500 determines the disposition of the virtual machines 110 in accordance with the virtual machine migration planning table 420-1 and the district dividing planning table 430-2. The disposition executing unit 500 includes a migration plan storing unit 510, a virtual machine migration unit 520, and a dividing plan storing unit 530.

The migration plan storing unit 510 is a storage region for storing the virtual machine migration planning table 420-1 generated by the migration plan generating unit 420.

The virtual machine migration unit 520 disposes the virtual machines 110 on the physical machines 100 in accordance with the virtual machine migration planning table 420-1 stored in the migration plan storing unit 510 and the district dividing planning table 430-2 stored in the dividing plan storing unit 530. More specifically, the virtual machine migration unit 520 reads out the virtual machine migration planning table 420-1 and the district dividing planning table 430-2 at every unit time. When there is a virtual machine 110 for which the migration time has arrived in the virtual machine migration planning table 420-1 thus read out, the virtual machine migration unit 520 migrates such a virtual machine 110 to its migration destination. The virtual machine migration unit 520 further checks the district dividing planning table 430-2 and, when there is a district for which the time for district division has arrived, it starts the processing for dividing such a district.

The dividing plan storing unit 530 is a storage region for storing the district dividing planning table 430-2 and the virtual machine disposition planning table 430-3 generated by the dividing plan generating unit 430.

The planning system 10 calculates in advance the times and locations at which the moving objects 200 move between districts on the basis of the moving route information 210-1 (FIG. 4) sent from the moving objects 200 and the route information 310 (FIG. 5) and increases in advance the number of physical servers allocated to a district when the moving objects 200 are expected to concentrate to the district. This produces an advantageous effect by enabling the planning system 10 to predict the load on the servers and to provide additional physical servers on the basis of the prediction, without history information.

A whole operation according to the present example embodiment will now be described in detail with reference to the flow charts in FIGS. 11, 12, 13, and 17.

Figure 11:
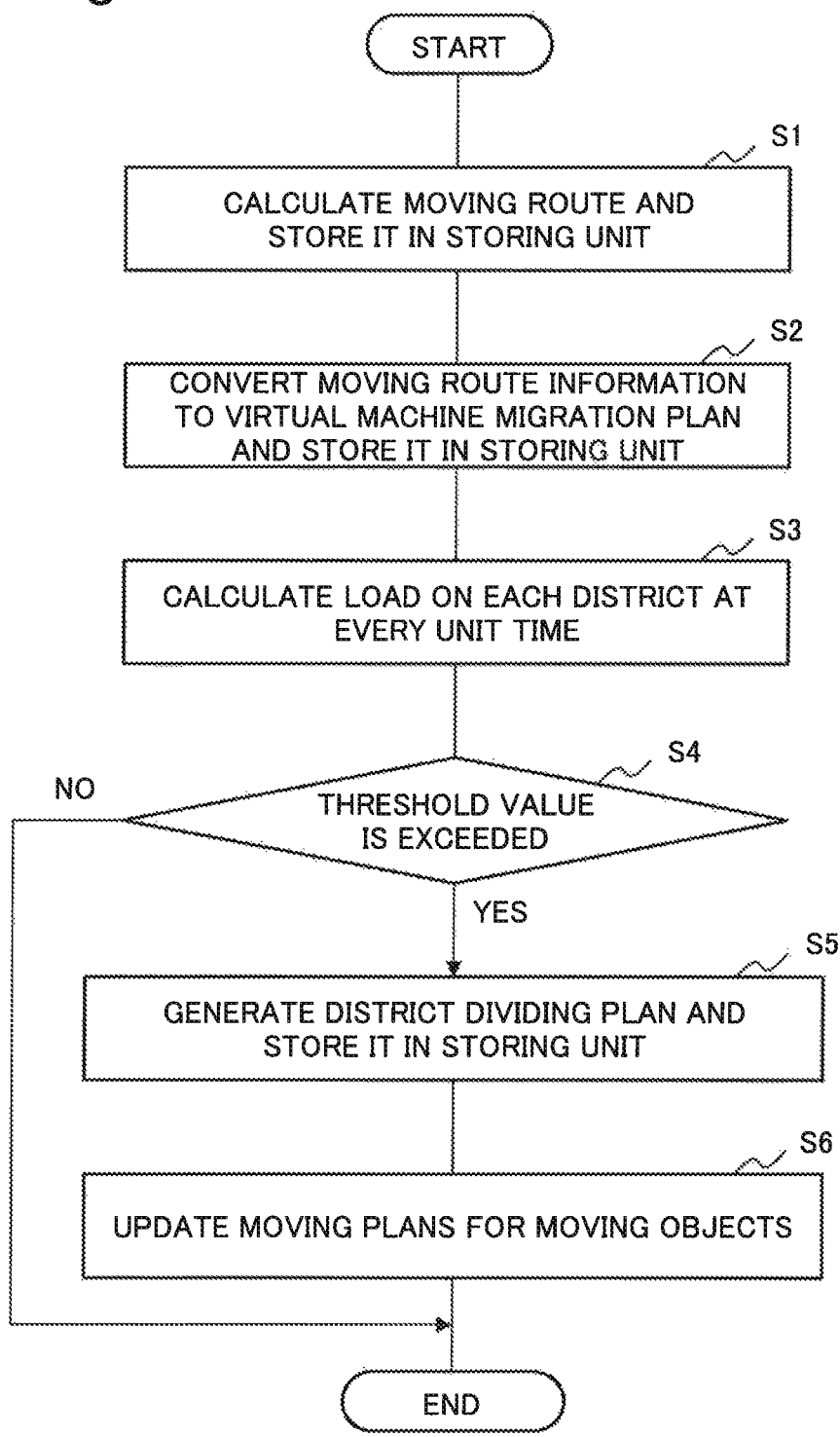
FIG. 11 is a flow chart illustrating a whole operation according to the first example embodiment of the present invention.

FIG. 11 illustrates a whole operation according to the present example embodiment. First, the moving route calculating unit 210 calculates a moving route and stores moving route information 210-1 in the moving route storing unit 410 in the disposition planning unit 400 (step S1). Next, the migration plan generating unit 420 converts the moving route information 210-1 to a virtual machine migration planning table 420-1 (FIG. 7) on the basis of the simulation basic information 300 (FIGS. 5 and 6) and stores the virtual machine migration planning table 420-1 in the migration plan storing unit 510 in the disposition executing unit 500 (step S2). The conversion to the virtual machine migration planning table 420-1 will be described later with reference to FIGS. 12 to 16.

Next, the dividing plan generating unit 430 calculates the load on each of the districts at every unit time (one second) (step S3) and generates a time-load list 430-1 for each of the districts (FIG. 8). When none of the loads on the districts exceeds the threshold value (NO at S4), the dividing plan generating unit 430 ends the processing. When one or more of the loads exceed the threshold value (YES at S4), the dividing plan generating unit 430 generates a district dividing planning table 430-2 (FIG. 9) and stores the district dividing planning table 430-2 in the dividing plan storing unit 530 in the disposition executing unit 500 (step S5). When, for example, the load on district 1 exceeds the threshold value at the start time 14:24:35 (14 hours 24 minutes 35 seconds), the dividing plan generating unit 430 divides the district 1 into two districts having new district IDs 1-1 and 1-2 and calculates the locations of the new districts (new district locations 435). The division of a district and the calculation of the locations will be described later with reference to FIG. 17. After the locations of the new districts are determined, the dividing plan generating unit 430 generates a district dividing planning table 430-2 as illustrated in FIG. 9 and stores the district dividing planning table 430-2 in the dividing plan storing unit 530. A district dividing planning table 430-2 may be similarly generated also for other districts.

Lastly, the dividing plan generating unit 430 updates the moving plans for the moving objects 200 (step S6). Step S6 is necessary in the following case. When the dividing plan generating unit 430 generates the district dividing planning table 430-2, the moving objects 200 scheduled to move in the divided district will be moving in a district to which a different physical server will be allocated. Therefore, when the dividing plan generating unit 430 generates the district dividing planning table 430-2, it needs to update the virtual machine migration planning table 420-1 for the moving objects 200 that are to travel in the divided districts.

Figure 12:
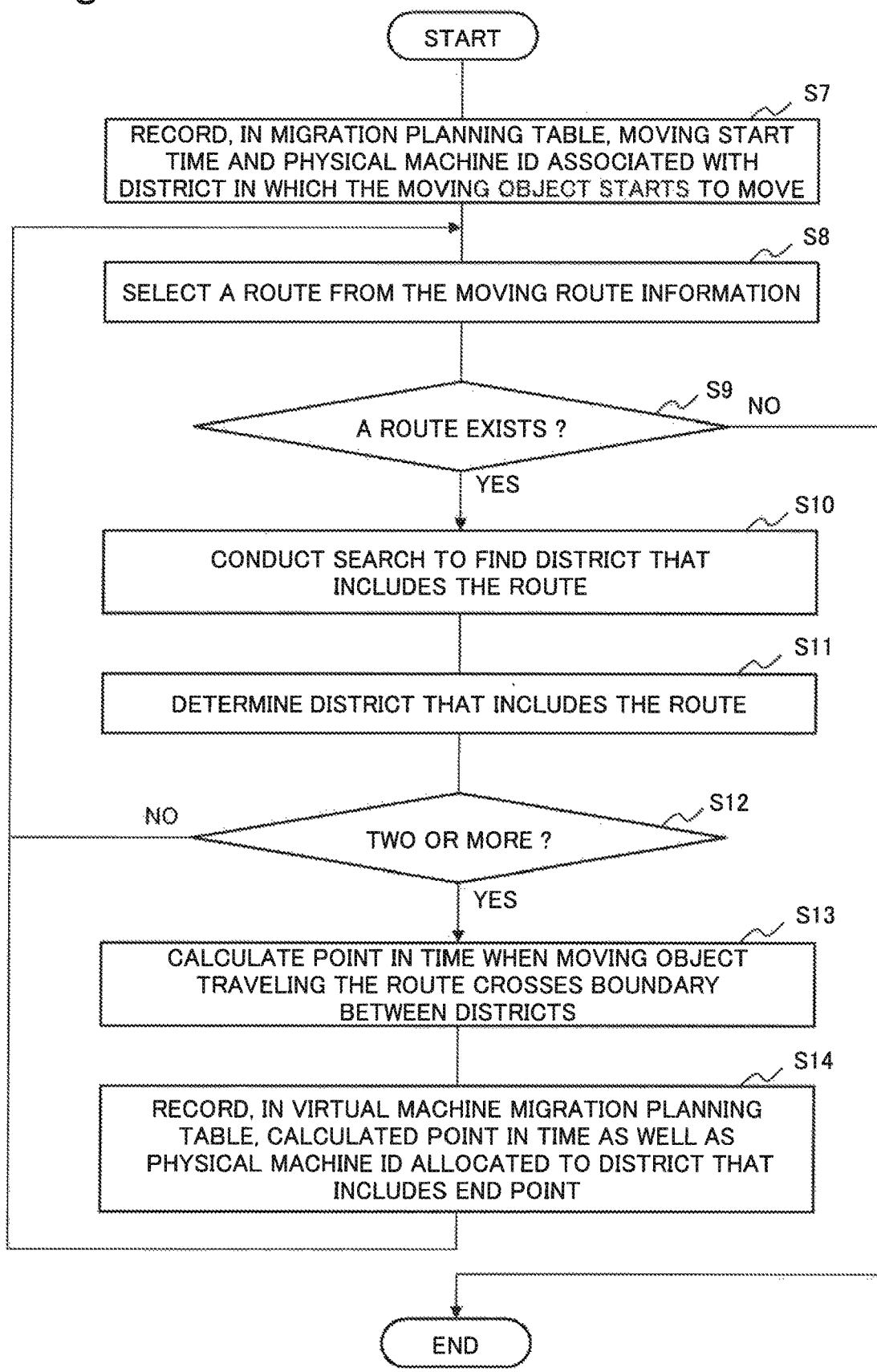
FIG. 12 is a flow chart illustrating an operation of a migration plan generating unit according to the first example embodiment of the present invention.

FIG. 12 is a flow chart illustrating an operation of the migration plan generating unit 420. First, the migration plan generating unit 420 records in the virtual machine migration planning table 420-1 the moving start time 212 in the moving route information 210-1 and the physical machine ID 326 in the district information 320 associated with the district in which the moving object starts to move (step S7). Next, the migration plan generating unit 420 selects a route from the moving route information 210-1 (step S8) and ends the processing when there is no route (No at step S9). When there is a route (YES at step S9), the migration plan generating unit 420 conducts a search to find a district that includes the route (step S10). The migration plan generating unit 420 searches the district information 320 for a district that includes a relay point 312 of the route. The migration plan generating unit 420 then determines the district that includes the route (step S11) and, when two or more districts include the route (YES at step S12), the migration plan generating unit 420 calculates the point in time when the moving object 200 traveling the route crosses the boundary between the districts (step S13). The migration plan generating unit 420 then records in the virtual machine migration planning table 420-1 the calculated point in time as well as the physical machine ID 326 allocated to the district that includes the end point of the route (step S14). The method of calculating the point in time when the moving object 200 crosses the boundary between the districts will be described with reference to the next flow chart.

Figure 13:
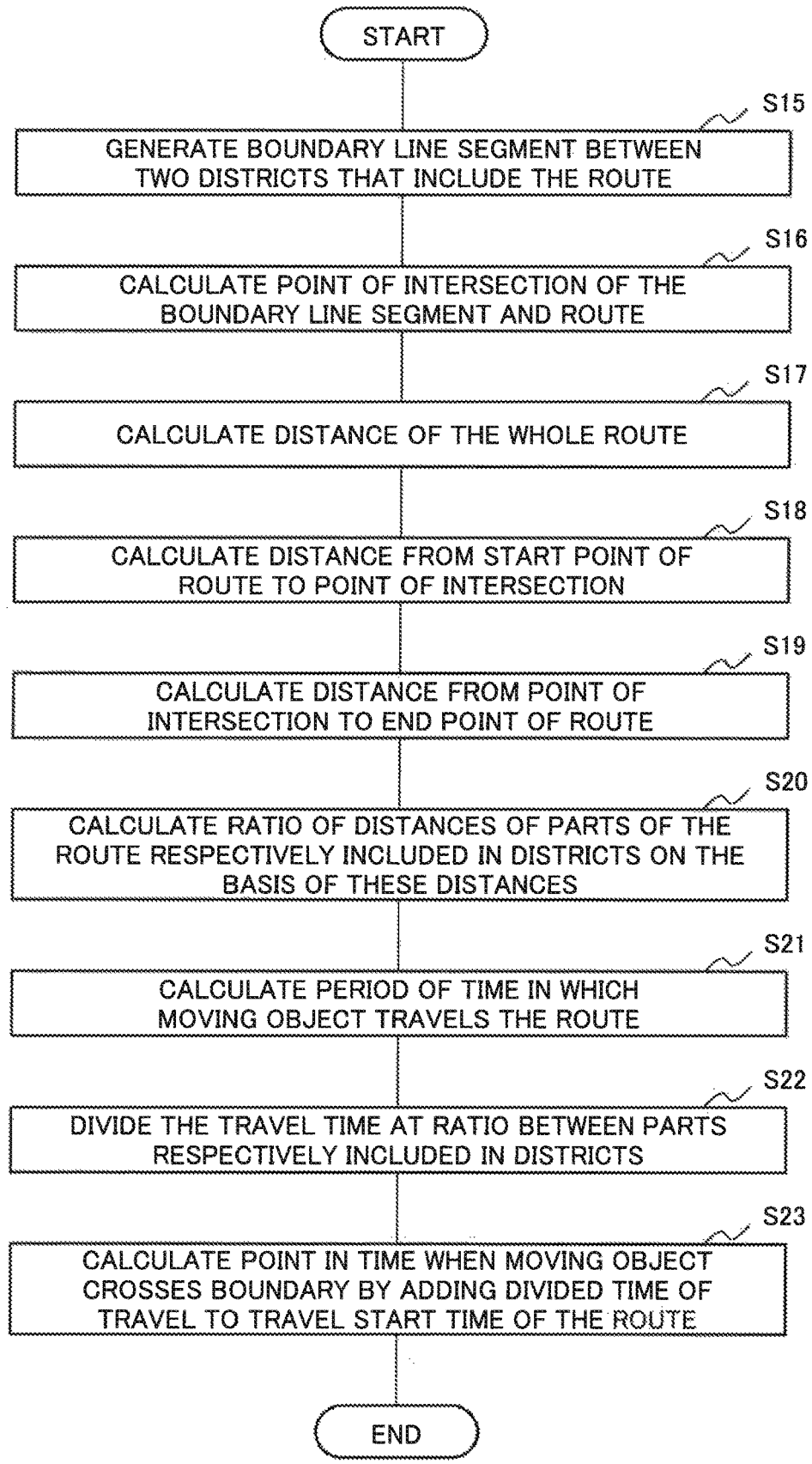
FIG. 13 is a flow chart illustrating an operation of a calculation method of migration time of a virtual machine according to the first example embodiment of the present invention.

FIG. 13 is a flow chart illustrating a method of calculating the point in time when the moving object 200 crosses the boundary between the districts when the migration plan generating unit 420 generates the virtual machine migration planning table 420-1.

Figure 14:
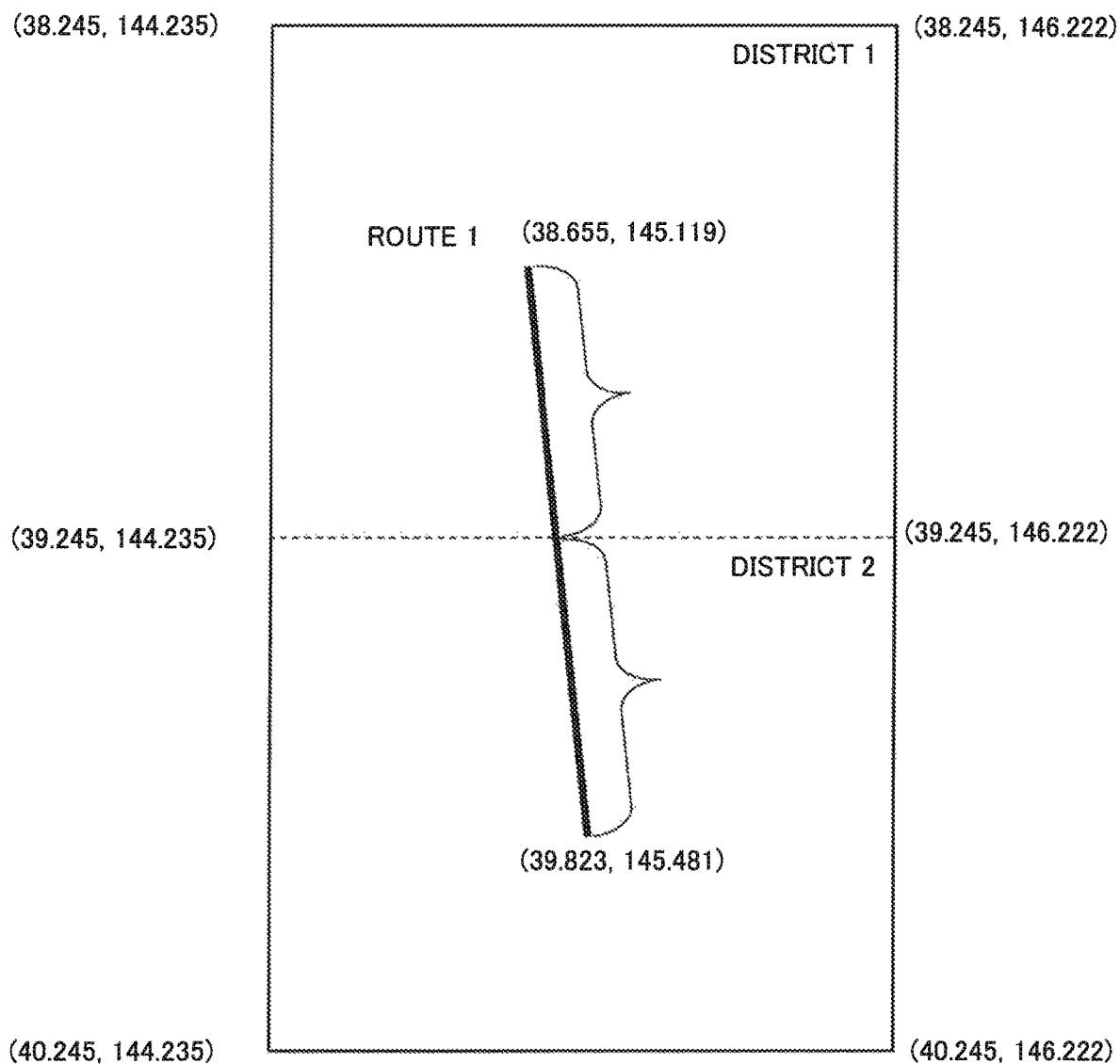
FIG. 14 is a diagram for describing a calculation of a boundary between districts according to the first example embodiment of the present invention.

First, the migration plan generating unit 420 generates a line segment that forms the boundary between the two districts that include the route (step S15). The boundary line segment is calculated by comparing the latitudes and the longitudes in the district information 320 (FIG. 6). The FIG. 14 is a diagram for describing the calculation method of the point in time when the moving object 200 crosses the boundary. As illustrated in in FIG. 14, district 1 and district 2 adjoin each other north to south and the boundary line segment between them is a line segment connecting a start point (39.245, 144.235) and an end point (39.245, 146.222).

Next, the migration plan generating unit 420 calculates the point of intersection of the boundary line segment and the route (step S16).

FIG. 15 is a formula for calculating the point of intersection when the migration plan generating unit 420 generates the virtual machine migration planning table 420-1. By substituting the coordinates of the boundary line segment and the coordinates of the route 1 in FIG. 14 into the formula for calculating the coordinates of the point of intersection, the point of intersection of the boundary line segment and the route is calculated as (39.245, 145.381). The coordinates in FIG. 15 are the coordinates of the start point of the route (x1, y1), the coordinates of the end point of the route (x2, y2), the coordinates of the start point of the boundary line between the districts (x3, y3), and the coordinates of the end point of the boundary line between the districts (x4, y4). As illustrated in FIG. 15, α, β, and Δ are results of calculation of respective determinants from the above-described values of coordinates.

Next, the migration plan generating unit 420 calculates the distance of the whole route (step S17).

Figure 16:
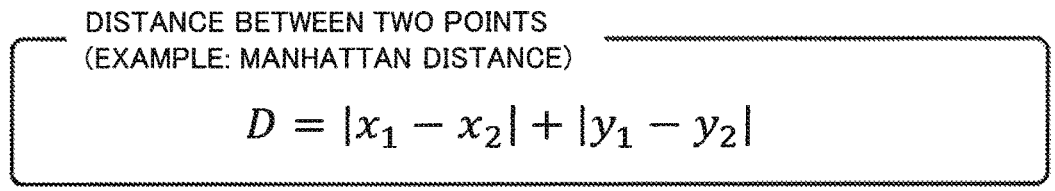
FIG. 16 is a diagram for describing a method of obtaining the distance between two points according to the first example embodiment of the present invention.

FIG. 16 is a formula for calculating the distance between two points. The distance is obtained by applying this formula to the start point and the end point of the route. Although a formula for obtaining Manhattan distance is employed in FIG. 16, other formulas, for example, a formula for obtaining Euclidean distance, may be employed.

Next, the migration plan generating unit 420 calculates the distance from the start point of the route to the point of intersection (step S18) and then calculates the distance from the point of intersection to the end point of the route (step S19). The migration plan generating unit 420 then calculates the ratio of the distances of the parts of the route respectively included in the districts on the basis of these distances (step S20). In the example of FIG. 14, the distance of the whole route is 1.53 (about 2.68 km), the distance from the start point to the point of intersection is 0.852, and the distance from the point of intersection to the end point is 0.678; therefore, the ratio between the distance from the start point to the point of intersection and the distance from the point of intersection to the end point is 0.556:0.449.

Next, the migration plan generating unit 420 calculates the period of time in which the moving object 200 travels the route (step S21). By the above-described calculation, the time of travel along the route 1 is known to be 4 minutes 30 seconds. Next, the migration plan generating unit 420 divides the afore-mentioned travel time at the ratio between the distances of the parts respectively included in the districts (step S22). In other words, the travel time from the start point to the point of intersection is 150.12 seconds and the travel time from the point of intersection to the end point is 121.23 seconds. Lastly, the migration plan generating unit 420 calculates the point in time when the moving object 200 crosses the boundary by adding a divided time of travel to the travel start time of the route (step S23). In other words, the time of travel from the start point to the point of intersection i.e., 150.12 seconds is added.

Figure 17:
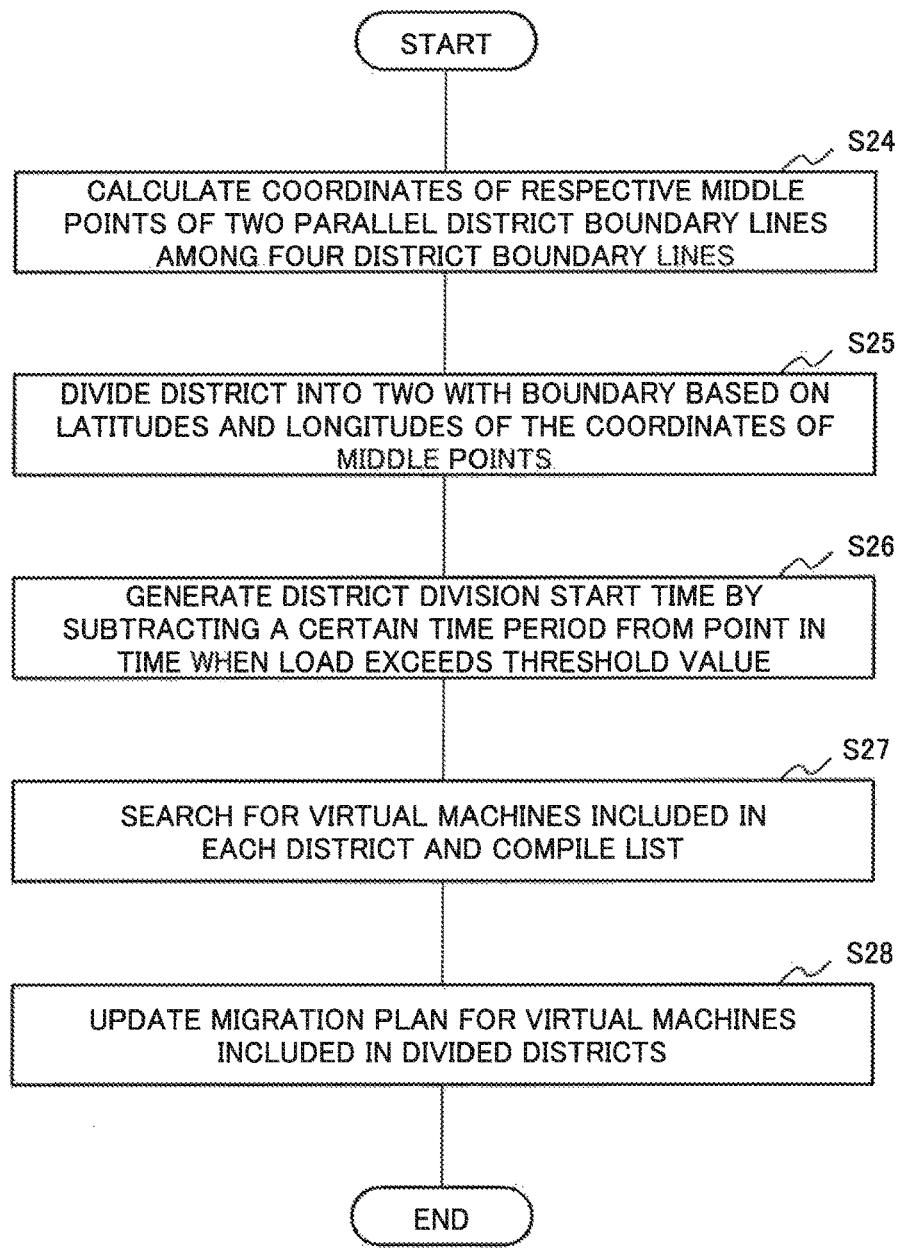
FIG. 17 is a flow chart illustrating an operation of a district division method according to the first example embodiment of the present invention.

FIG. 17 is a flow chart illustrating a method of dividing a district by the dividing plan generating unit 430. First, the dividing plan generating unit 430 calculates the coordinates of the middle points of such district boundary lines among the four district boundary lines specified by the district information 320 (FIG. 6) that the middle points serve as the basis for drawing a boundary line between two districts adjoining in parallel (step S24). The significance of step S24 is to divide a district either north to south or east to west. Next, the dividing plan generating unit 430 divides the district into two with a boundary based on the latitudes and longitudes of the coordinates of the middle points (step S25). In step S25, the dividing plan generating unit 430 generates new district IDs 434 and new district locations 435 in the district dividing planning table 430-2 (FIG. 9). Furthermore, the dividing plan generating unit 430 generates, in the virtual machine disposition planning table 430-3 (FIG. 10), combinations of new district IDs 434 and physical machine IDs 326. Assume that a physical machine 100 (physical machine ID 14) is newly allocated in this step. Next, the dividing plan generating unit 430 generates a division start time 433 by subtracting a certain time period from the point in time when the load exceeds the threshold value (step S26). The method of calculating the certain time period has been described above. Next, the dividing plan generating unit 430 searches for virtual machines 110 included in each district and compiles a list (step S27). In step S27, the dividing plan generating unit 430 obtains a list of virtual execution machine IDs 421 of the virtual machine disposition planning table 430-3. Lastly, the dividing plan generating unit 430 updates the virtual machine migration planning table 420-1 (FIG. 7) for the virtual machines 110 included in the divided districts (step S28).

This concludes the description of an operation according to the first example embodiment of the present invention. The migration plan generating unit 420, the dividing plan generating unit 430, and the virtual machine migration unit 520 are constituted by, for example, hardware circuits such as logic circuits.

The moving route storing unit 410, the migration plan storing unit 510, and the dividing plan storing unit 530 are constituted by, for example, storage apparatuses such as disk apparatuses or semiconductor memory devices.

The memory 350, the migration plan generating unit 420, the dividing plan generating unit 430, and the virtual machine migration unit 520 may be realized by a computer apparatus. In such a case, the migration plan generating unit 420, the dividing plan generating unit 430, the virtual machine migration unit 520 may be control circuits realized by the processor, which is a computer, of the disposition planning unit 400 and the disposition executing unit 500 executing a program stored in a memory device, which is not illustrated. The program may be stored in a non-volatile memory device. The program may include commands and the like for executing the processing illustrated in the flow charts in FIGS. 11 to 13 and FIG. 17.

The planning system 10 according to the present example embodiment has advantageous effects as in the following.

The present example embodiment has advantageous effects that the load on the servers can be predicted and additional physical servers can be provided on the basis of the prediction, without history information of simulation.

This is made possible by calculating in advance the times and locations at which the moving objects 200 move between districts on the basis of the moving route information 210-1 sent from the moving objects 200 and by increasing in advance the number of physical servers allocated to a district when the moving objects 200 are expected to concentrate to the district.

More specifically, the planning system 10 includes a migration plan generating unit 420, which generates a migration plan for the virtual machines 110 that represent moving objects 200 in the moving object simulation, on the basis of the moving routes that the moving objects 200 plan to travel. Further, the planning system 10 includes a dividing plan generating unit 430, which predicts the load on the physical machines 100 on which the virtual machines 110 operate, on the basis of the migration plan for the virtual machines 110 and allocates physical machines 100 to the districts created by dividing geographical areas in the moving object simulation.

Second Example Embodiment

A second example embodiment of the present invention will now be described in detail with reference to the drawings.

Figure 18:
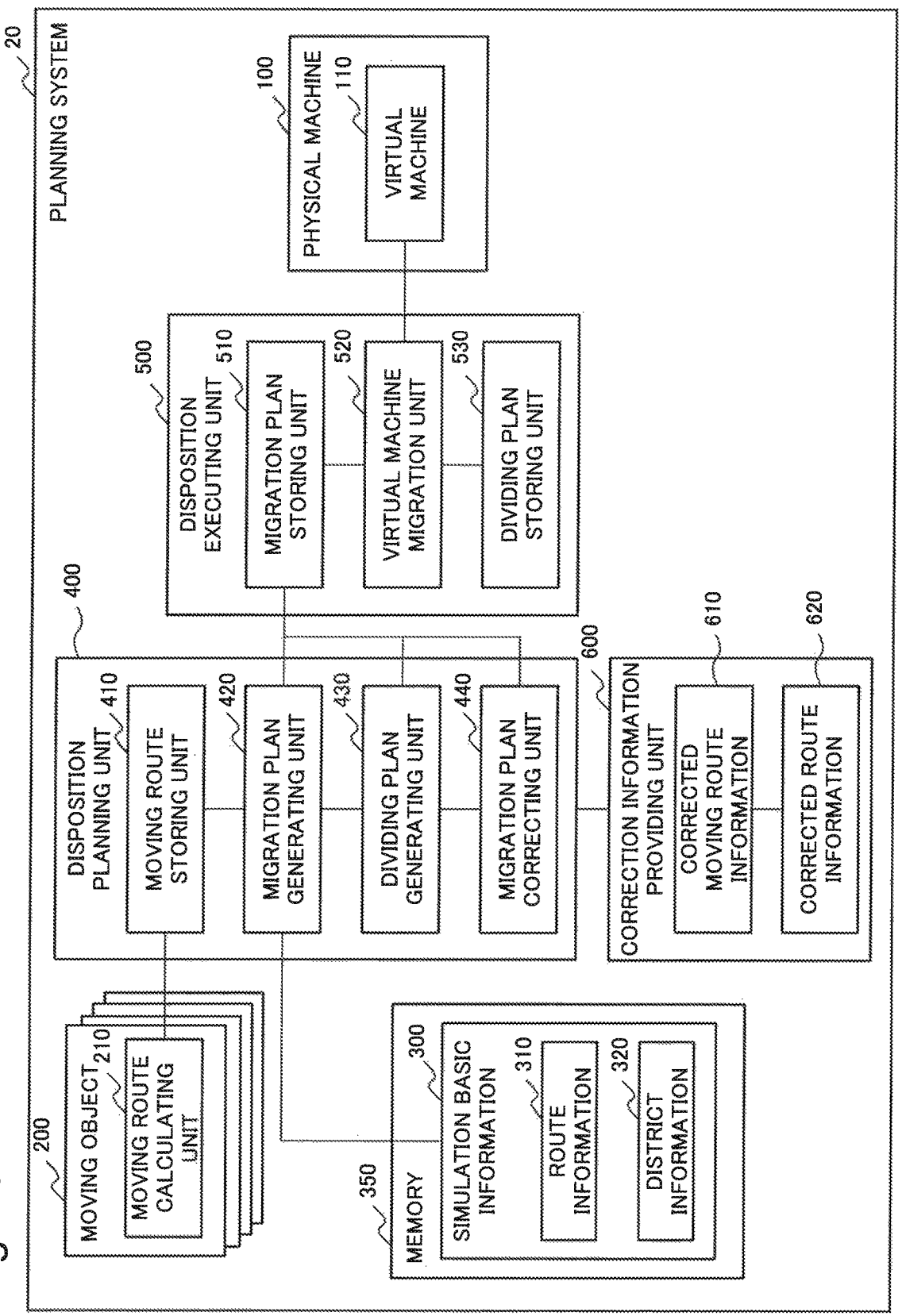
FIG. 18 is a block diagram illustrating an example configuration of a planning system according to a second example embodiment of the present invention.

FIG. 18 is a block diagram illustrating an example configuration of a planning system 20 according to a second example embodiment.

With reference to FIG. 18, the planning system 20 for carrying out the second example embodiment of the present invention includes a correction information providing unit 600 in addition to the components in the first example embodiment, and the disposition planning unit 400 includes a migration plan correcting unit 440. The correction information providing unit 600 includes corrected moving route information 610 and corrected route information 620.

These components operate as in the following in outline.

On the basis of the moving routes of the moving objects 200 and other correction information received from the correction information providing unit 600, the migration plan correcting unit 440 corrects the virtual machine migration planning table 420-1 for the moving objects 200. More specifically, the correction information may include a change of a route by a moving object 200, a change in the speed limit 311 of a route, and the like. A change of the route by a moving object 200 happens, for example, when an automobile fails to move according to the instruction by the automotive navigation system and selects a wrong route. A change in the speed limit 311 happens, for example, when the moving object 200 can no longer travel the route as fast as previously due to a congestion, an accident, or the like.

The migration plan correcting unit 440 behaves differently according to the type of information that it receives from the correction information providing unit 600. When the information received from the correction information providing unit 600 is a piece of corrected moving route information 610, the migration plan correcting unit 440 deletes from the migration plan table 420-1 the combinations of the physical machine IDs 326 and such points in time that are coincident with or subsequent to the point in time when the corrected moving route information 610 was received and recalculates the districts in which the moving object 200 travels and the information on the points in time. When the information received is a piece of corrected route information 620, the migration plan correcting unit 440 changes only the migration times the moving objects 200 across the districts in the virtual machine migration planning table 420-1.

The correction information providing unit 600 provides the migration plan correcting unit 440 with correction information for the virtual machine migration planning table 420-1.

Figure 19:
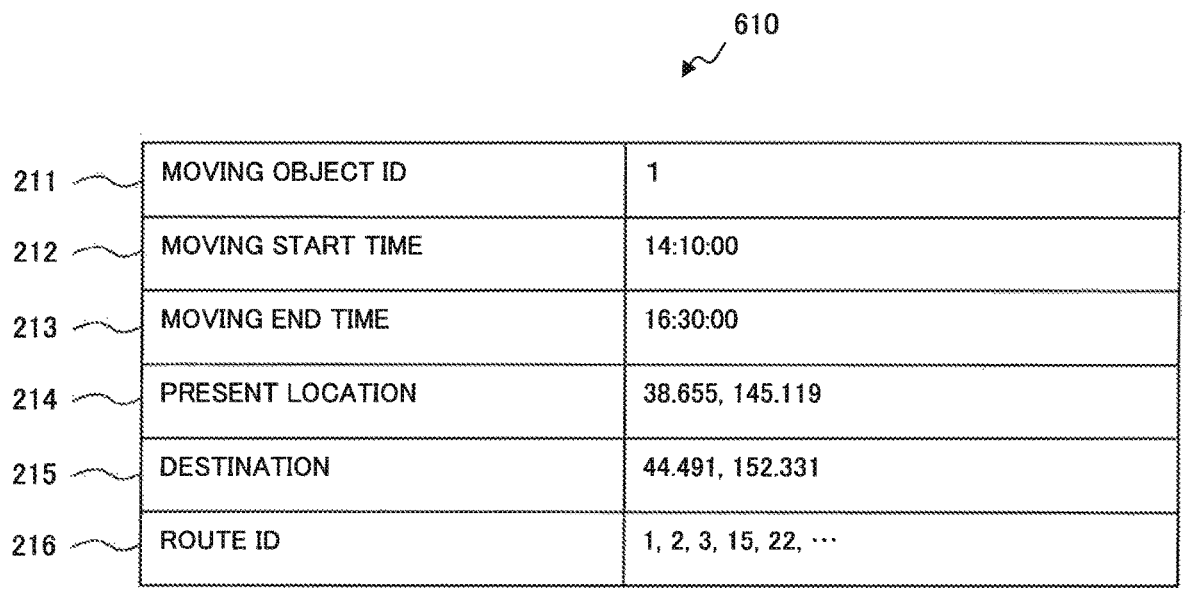
FIG. 19 is a diagram illustrating an example data structure of corrected moving route information according to the second example embodiment of the present invention.

The corrected moving route information 610 is generated and transmitted to the migration plan correcting unit 440 when a moving route of a moving object 200 has changed. FIG. 19 illustrates an example data structure of the corrected moving route information 610. As illustrated in FIG. 19, the corrected moving route information 610 includes a moving object ID 211, a moving start time 212, a moving end time 213, a present location 214, a destination 215, and route IDs 216. The basic data structure is the same as that of the moving route information 210-1 illustrated in FIG. 4.

Figure 20:
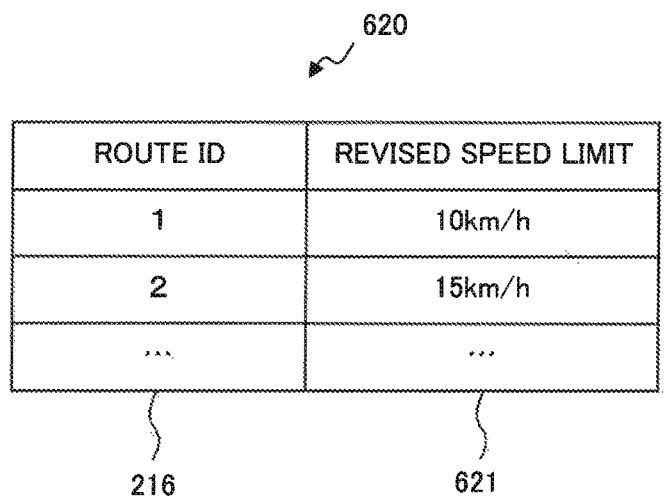
FIG. 20 is a diagram illustrating an example data structure of corrected route information according to the second example embodiment of the present invention.

The corrected route information 620 is generated and transmitted to the migration plan correcting unit 440 when the speed limit 311 has been changed in a route that a moving object 200 travels due to a congestion, an accident, or the like. FIG. 20 illustrates an example data structure of the corrected route information 620. As illustrated in FIG. 20, the corrected route information 620 includes route IDs 216 and revised speed limits 621. The migration times in the virtual machine migration planning table 420-1 of the moving objects 200 traveling a route with a route ID 216 included in the corrected route information 620 will be updated.

Figure 21:
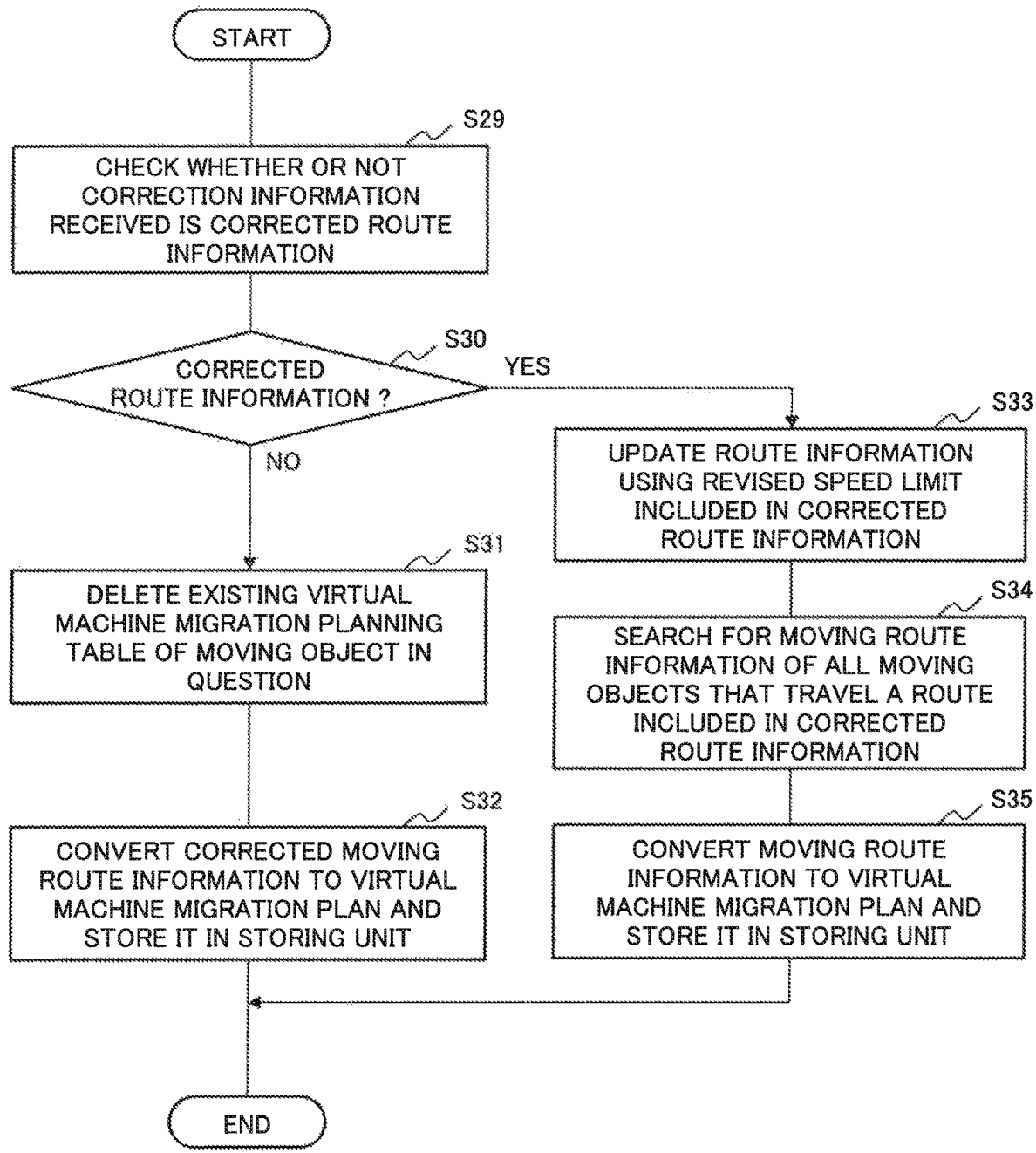
FIG. 21 is a flow chart illustrating an operation of a migration plan correcting unit according to the second example embodiment of the present invention.

A processing procedure by the migration plan correcting unit 440 will now be described with reference to the flow chart in FIG. 21.

First, the migration plan correcting unit 440 checks whether or not the correction information that it has received is a piece of corrected route information 620 (step S29). If the correction information it has received is a piece of corrected route information 620 (YES in S30), the migration plan correcting unit 440 updates the route information 310 using the revised speed limits 621 included in the corrected route information 620 (step S33). Next, the migration plan correcting unit 440 searches for moving route information 210-1 of all the moving objects 200 that travel the routes included in the corrected route information 620 (step S34). When there is a moving object 200 that travels a route included in the corrected route information 620, the migration plan correcting unit 440 converts the moving route information 210-1 of the moving object 200 and stores the converted moving route information 210-1 in the moving route storing unit 410 in the disposition planning unit 400 (step S35).

If the correction information that the migration plan correcting unit 440 has received is not a piece of corrected route information 620 (NO in S30), the correction information relates to a corrected moving route and the migration plan correcting unit 440 executes the procedure for processing the corrected moving route. First, the migration plan correcting unit 440 deletes the existing virtual machine migration planning table 420-1 of the moving object 200 in question (step S31). Next, the migration plan correcting unit 440 converts the corrected moving route information 610 to a virtual machine migration planning table 420-1 and stores the virtual machine migration planning table 420-1 in the migration plan storing unit 510 (step S32). The technique for converting the corrected moving route information 610 to the virtual machine migration planning table 420-1 is the same as has been described for the function of the migration plan generating unit 420 according to the first example embodiment of the present invention and will not be further described.

The planning system 20 according to the present example embodiment has advantageous effects as in the following.

The present example embodiment has advantageous effects that the prediction of the load on the physical servers can be dynamically changed in response to the behaviors of moving objects 200.

This is made possible by planning system 20 being configured to change the moving route information 210-1 and the virtual machine migration planning table 420-1 of the relevant moving objects 200 in accordance with revised moving route information on the moving objects 200 and revised speed limit information on the routes.

Third Example Embodiment

A third example embodiment of the present invention will now be described in detail with reference to the drawings.

Figure 22:
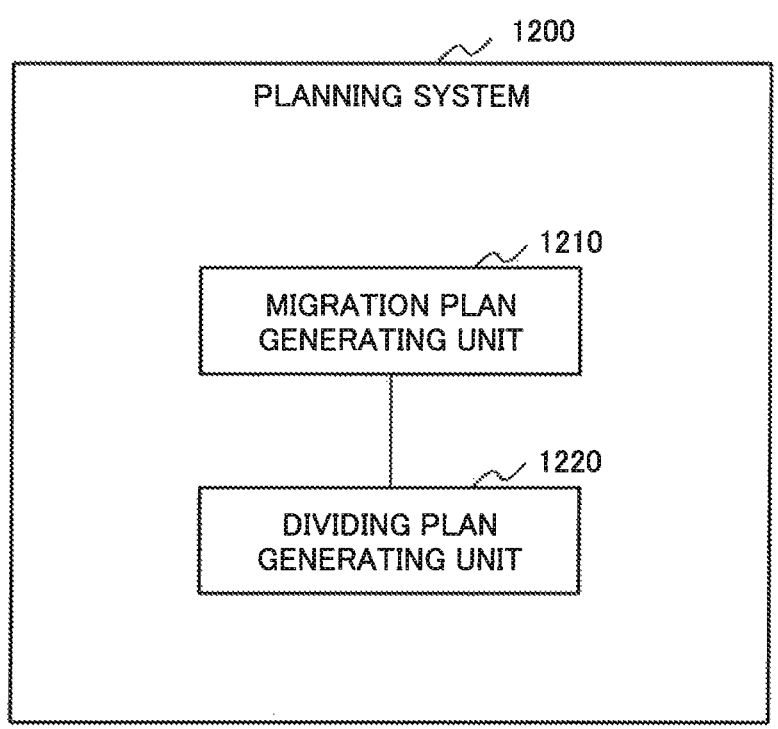
FIG. 22 is a block diagram illustrating an example configuration of a planning system according to a third example embodiment of the present invention.

FIG. 22 is a block diagram illustrating an example configuration of a planning system 1200 according to a third example embodiment.

The planning system 1200 includes a migration plan generating unit 1210 and a dividing plan generating unit 1220.

The migration plan generating unit 1210 generates a migration plan of the virtual machines representing the moving objects in the moving object simulation on the basis of the moving routes that the moving objects plan to travel.

The dividing plan generating unit 1220 predicts the load on the physical machines on which the virtual machines operate, on the basis of the migration plan for the virtual machines and allocates physical machines to the districts created by dividing geographical areas in the moving object simulation.

The planning system 1200 according to the present example embodiment has advantageous effects as in the following.

The present example embodiment has advantageous effects that the load on the servers can be predicted and additional physical servers can be provided on the basis of the prediction, without history information of simulation.

This is made possible by the following arrangement. The migration plan generating unit 1210 generates a migration plan of the virtual machines representing the moving objects in the moving object simulation on the basis of the moving routes that the moving objects plan to travel. The dividing plan generating unit 1220 then predicts the load on the physical machines on which the virtual machines operate, on the basis of the migration plan for the virtual machines and allocates physical machines to the districts created by dividing geographical areas in the moving object simulation.

Example embodiments have been described with reference to the drawings above but the present invention is not limited to the above-described example embodiments. Various modifications that those skilled in the art can understand can be made to the structure and details of the present invention without departing from the scope of the present invention.

EXAMPLES

Specific examples of example embodiments for carrying out the present invention will now be described using specific examples.

Figure 23:
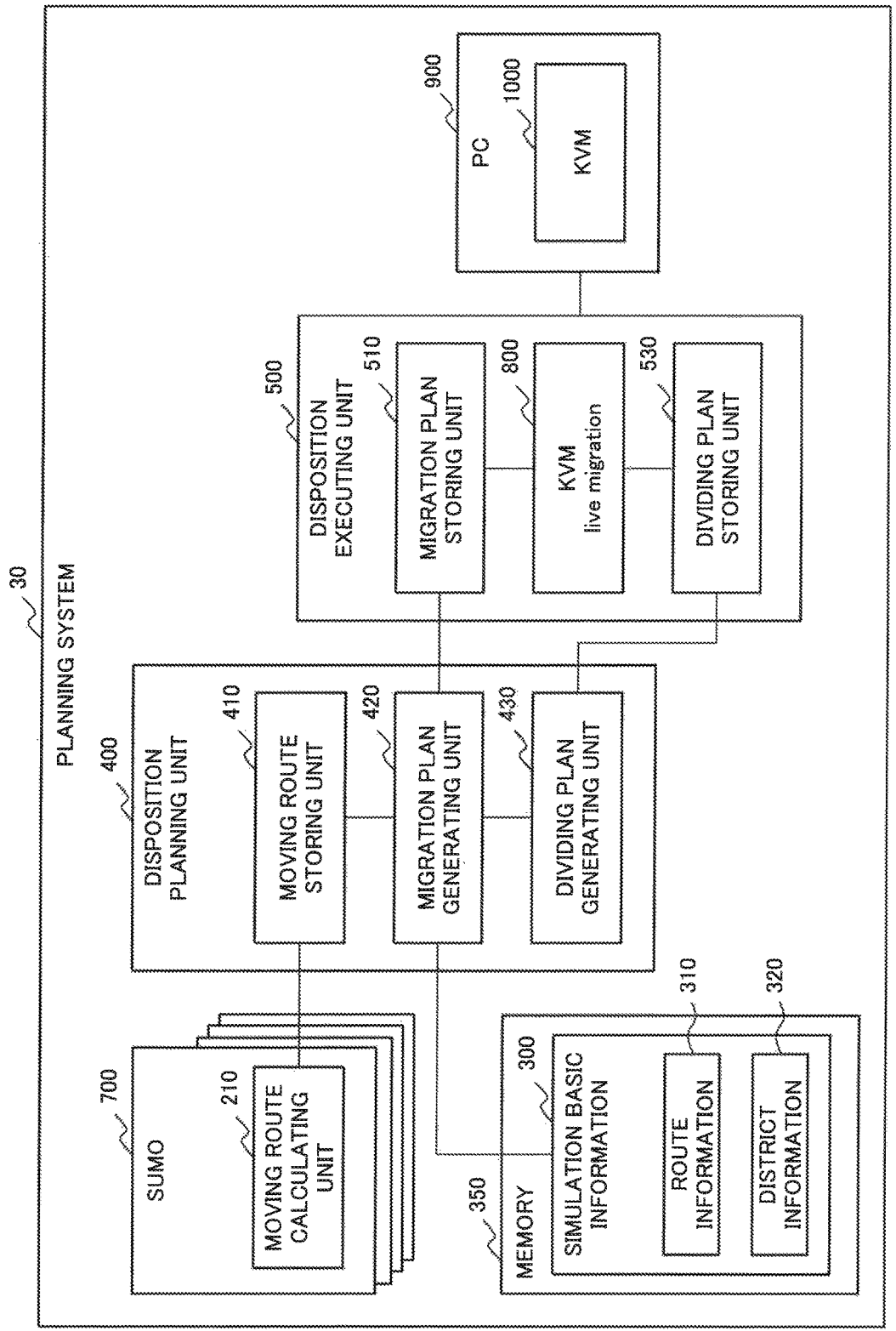
FIG. 23 is a block diagram illustrating a configuration of a planning system according to a specific example 1 of the first example embodiment of the present invention.

FIG. 23 is a block diagram illustrating a configuration of a planning system 30 according to a specific example 1 of the first example embodiment of the present invention.

As illustrated in FIG. 23, according to the first example embodiment of the present invention, Simulation of Urban Mobility (SUMO, registered trademark) 700, which is a traffic simulator, is used as a specific example of the moving objects 200. Kernel-based Virtual Machine (KVM) live migration (registered trademark) 800 is used as a specific example of the virtual machine migration unit 520. A personal computer (PC) 900 is used as the group of physical machines 100 and KVM 1000 is used as the virtual machines 110.

Figure 24:
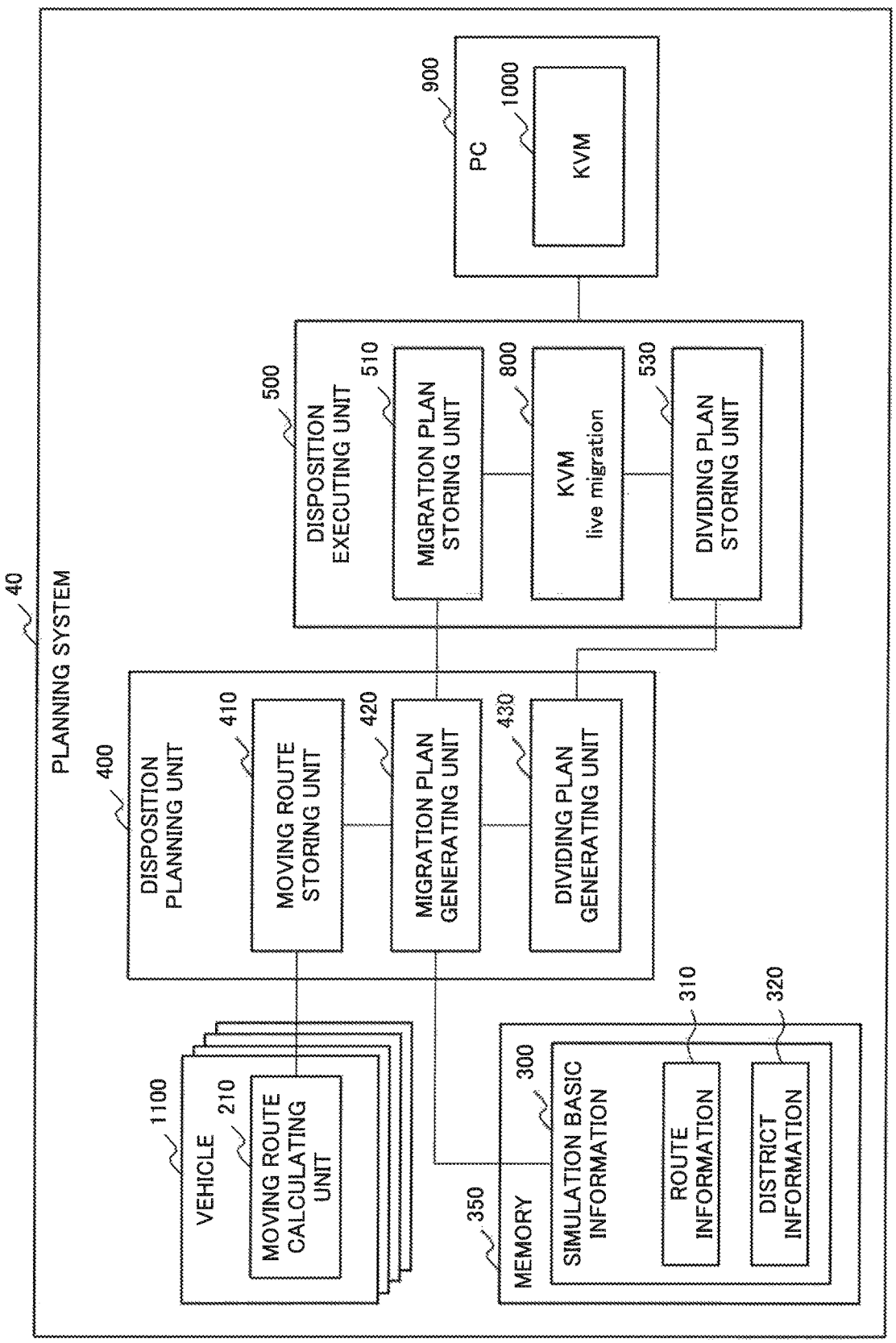
FIG. 24 is a block diagram illustrating a configuration of a planning system according to another specific example 2 of the first example embodiment of the present invention.

FIG. 24 is a block diagram illustrating a configuration of a planning system 40 according to another specific example 2 of the first example embodiment of the present invention.

As illustrated in FIG. 24, according to the first example embodiment of the present invention, real automobiles 1100 and automotive navigation systems mounted on the real automobiles 1100 may be used as a specific example of the moving objects 200. This method of utilization is employed in cases, for example, in which the client terminals mounted on the moving objects 200 (automobiles 1100 in the present specific example) and the virtual machines 110 disposed outside the moving objects 200 are mutually communicating and the virtual machines 110 are migrated to the closest geographical vicinity of the moving objects 200 to follow the movement of the moving objects 200. Migrating the virtual machine 110 to the vicinity of the moving objects 200 produces advantageous effects of reducing delay in communication.

According to the present example embodiment, the moving route calculating unit 210 converts the navigation information outputted by the automotive navigation systems mounted on automobiles to the moving route information 210-1 of the present invention and an instruction to provide additional physical machines 100 can be issued in advance in regard to the physical machine 100 installed in a place where virtual machines 110 are expected to concentrate.

The present application claims priority based on the Japanese Patent Application No. 2015-239510, filed Dec. 8, 2015 and the disclosure thereof is herein incorporated in its entirety by reference.

REFERENCE SIGNS LIST

10 planning system
20 planning system
30 planning system
40 planning system
100 physical machine
110 virtual machine
120 moving object simulation program
200 moving object
210 moving route calculating unit
210-1 moving route information
211 moving object ID
212 moving start time
213 moving end time
214 present location
215 destination
216 route ID
300 simulation basic information
310 route information
311 speed limit
312 relay point
320 district information
321 district ID
322 north side latitude
323 south side latitude
324 west side longitude
325 east side longitude
326 physical machine ID
350 memory
400 disposition planning unit
410 moving route storing unit
420 migration plan generating unit 420-1 virtual machine migration planning table
421 virtual machine ID
422 virtual machine start time
423 virtual machine migration time
430 dividing plan generating unit
430-1 time-load list
430-2 district dividing planning table
430-3 virtual machine disposition planning table
431 point in time
432 number of virtual machines
433 start time
434 new district ID
435 new district location
500 disposition executing unit
510 migration plan storing unit
520 virtual machine migration unit
530 dividing plan storing unit
600 correction information providing unit
610 corrected moving route information
620 corrected route information
621 revised speed limit
700 SUMO
800 KVM live migration
900 PC
1000 KVM
1100 automobile
1200 planning system
1210 migration plan generating unit
1220 dividing plan generating unit
2000 map
3000 moving object
4000 physical machine
4001 physical machine
4002 physical machine
4003 physical machine

What is claimed is:

1. A planning system comprising:
a memory that stores a set of instructions; and
at least one processor configured to execute the set of instructions to:
generate a migration plan of virtual machines representing moving objects in a moving object simulation, based on moving routes that the moving objects plan to travel;
predict, based on the migration plan of the virtual machines, loads on physical machines on which the virtual machines operate and allocate the physical machines to districts created by dividing a geographical area in the moving object simulation; and
calculate the moving routes, based on information on present locations and destinations of the moving objects.

2. The planning system according to claim 1, wherein the at least one processor is further configured to execute the set of instructions to predict loads on the physical machines, based on a number of virtual machines operating on the physical machines.

3. The planning system according to claim 2, wherein the at least one processor is further configured to execute the set of instructions to predict physical machines to the districts when the number of the virtual machines exceeds a threshold value.

4. A planning method comprising:
generating a migration plan of virtual machines representing moving objects in a moving object simulation, based on moving routes that the moving objects plan to travel;
predicting, based on the migration plan of the virtual machines, loads on physical machines on which the virtual machines operate and allocating the physical machines to districts created by dividing a geographical area in the moving object simulation; and
calculating the moving routes, based on information on present locations and destinations of the moving objects.

5. The planning method according to claim 4, comprising predicting loads on the physical machines, based on a number of virtual machines operating on the physical machines.

6. The planning method according to claim 5, comprising additionally allocating physical machines to the districts when the number of the virtual machines exceeds a threshold value.

7. A non-transitory recording medium for storing a planning program that causes a computer to execute:
a process of generating a migration plan of virtual machines representing moving objects in a moving object simulation, based on moving routes that the moving objects plan to travel;
a process of predicting, based on the migration plan of the virtual machine, loads on physical machines on which the virtual machines operate and allocating the physical machines to districts created by dividing a geographical area in the moving object simulation; and
a process of calculating the moving routes, based on information on present locations and destinations of the moving objects.

8. The non-transitory recording medium for storing a planning program according to claim 7 that causes a computer to execute a process of predicting loads on the physical machines, based on a number of virtual machines operating on the physical machines.

9. The non-transitory recording medium for storing a planning program according to claim 8 that causes a computer to execute a process of additionally allocating physical machines to the districts when the number of the virtual machines exceeds a threshold value.

* * * * *